S. HARTSHORN.

CURTAIN-FIXTURES.

No. 7,370. Reissued Oct. 31, 1876.

WITNESSES

L. D. Law

A. S. Curtiss

INVENTOR

Stewart Hartshorn

UNITED STATES PATENT OFFICE.

STEWART HARTSHORN, OF NEW YORK, N. Y.

IMPROVEMENT IN CURTAIN-FIXTURES.

ecification forming part of Letters Patent No. 68,502, dated September 3, 1867; reissue No. 5,558, dated September 2, 1873; reissue No. 7,370, dated October 31, 1876; application filed May 27, 1875.

*To all whom it may concern:*

Be it known that I, STEWART HARTSHORN, of the city, county, and State of New York, have invented a new and Improved Shade-Fixture; and I do hereby declare that the following is a full, clear, and exact description thereof, which will enable others skilled in the art to make and use the same, reference being had to the accompanying drawings, forming part of this specification.

This invention relates to a new and useful improvement in that class of shade-fixtures in which the shade-roller is provided with a spiral spring for automatically winding up the shade.

The present invention in an improvement on a shade-fixture of this class for which Letters Patent were granted to me, bearing date October 11, 1864, and reissued August 27, 1867, in which the pawl and ratchet or notched hub designed and used to arrest the rotation of and hold the roller were arranged to act automatically, and in such a manner that the shade could be stopped and retained at any desired position or point within the scope of its movement, by simply manipulating the shade and varying the speed of the rotation of the roller, and thereby dispensing with the use of side cords or counterpoises. As described and illustrated in such patent, the notched hub was attached to or made a part of the roller, while the pawl was fixed to one of the brackets which supported the rollers. In such arrangement, also, of these parts, when the roller is removed from its brackets, the pawl and notched hub are disconnected and the spring unwinds, which has again to be wound up previous to replacing the roller in its bearings.

In the present invention the pawl is hinged or pivoted as in the said patent referred to; but such pawl is placed on the end of the roller, or a part fixed thereto, and revolves with it, and the notched hub or ratchet is placed upon the spindle or stationary part of the fixture. Such arrangement of parts also permits the roller to be taken from its brackets without the spring unwinding.

Figure 1:
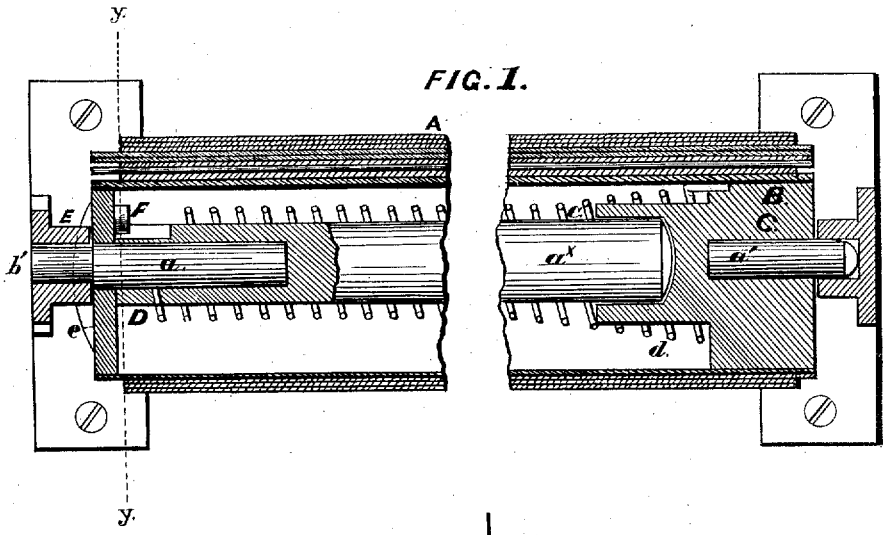
Figure 2:
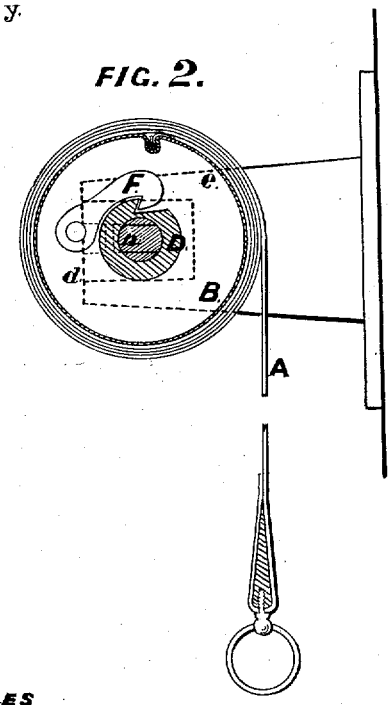
Figure 3:
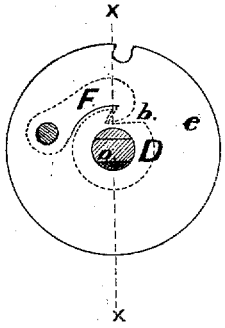

In the accompanying sheet of drawings, Figure 1 is a longitudinal central section of a roller employing my invention, taken in the line *x x*, Fig. 2; Fig. 2, a transverse section of the same, taken in the line *y y*, Fig. 1; and Fig. 3 is an end view of such roller, showing the flattened end of the spindle, and, in dotted lines, the position of the pawl and notched hub.

Similar letters of reference indicate corresponding parts.

A represents a window-shade, and B the roller to which it is attached, the roller having a spiral or other spring, C, fitted within it, and arranged in such a manner that it will have, when not restrained, a tendency to roll up the shade. The spring attachment, as represented, is the same as shown and described in my original Letters Patent. The roller B is provided with journals *a a'*, to one of which, *a*, sometimes called a "spindle," a hub, D, is keyed, said hub having a notch, *b*, made in it, as shown clearly in Fig. 2. The journal or spindle *a* of the roller is square, or has two flat sides at its outer end, as shown by dotted lines in Fig. 2, to fit into a bracket, E, attached to the window-frame, and this journal *a* does not turn with the roller; but the other journal, *a'*, is fitted firmly in a head, *c*, in the roller, and turns with it, and to such head the case of the roller (a metallic tube, *d*) is attached, the journal or spindle *a*, or an extension, $a^{\times}$, thereof, being fitted loosely in the head *c*, so that the roller may turn without the journal *a*, as will be fully understood by referring to Fig. 1. The end of the case or tube *d* of the roller has a disk, *e*, Figs. 2 and 3, secured in it, and this disk, as the roller B rotates, turns with it, and loosely on the fixed journal *a*. This disk *e* has a pawl or detent, F, attached to its inner side, as shown more particularly in Figs. 2 and 3, and such pawl or detent, when engaged with the notch *b* in hub D, retains or holds the roller B, so that it cannot turn under the influence of the spring C, and roll up the shade A. Such pawl or detent F is pivoted or hinged to the disk *e*, and acts substantially at right angles to the notched hub or spindle *a b*. The spring, when fitted in the case *d*, is attached at one end to the head *c*, and by the other end to the fixed journal or spindle *a*, or to its extension $a^{\times}$, and the spring is wound up by pulling down the shade B; consequently, when the shade is fully down the spring will have a tendency to wind it up.

The pawl or detent F engages itself with, and disengages itself from, the notched hub D automatically.

In the construction shown in the drawing, in order to insure the pawl engaging with the hub, the motion of the shade is simply checked; for, by having the roller A and its disk *e* rotate slowly, the pawl will drop into the notch *b;* but when such roller and disk are allowed to rotate rather quickly the pawl or detent will not drop into such notch, as its loose end will be carried, by the revolution of the roller, toward the periphery, or away from the notched hub; but, by changing or checking the revolution of the roller, the pawl will at once automatically drop into the notch and arrest the roller and shade. Hence the shade may be retained at any desired height without any difficulty whatever, as in the roller described in the previous patent, by merely varying or changing, through the simple manipulation of the shade, the speed of the rotation of the roller, and the consequent movement of the shade.

The pawl or detent F is a hinged or pivoted pawl, as distinguished from a loose pawl moving in a chamber or guide of some form to keep it in position.

I do not claim, generally, the arrangement of both the pawl and ratchet upon or in connection with the roller, so that the roller can be removed from its brackets without permitting the spring to unwind, as I believe such an arrangement of pawl or detent and ratchet, as shown in the patent of William Campbell, granted to him September 24, 1867, had been known previous to being made by myself.

What is claimed as new is—

In a spring shade-roller having a pawl or detent and ratchet, or their equivalent, constructed and arranged so as to engage automatically for holding the shade at any desired point or height, the combination, with a ratchet, or its equivalent, upon the stationary spindle or stationary part of the fixture, of a hinged or pivoted pawl, placed upon the end of the roller, and acting substantially at right angles to the ratchet or notched hub.

STEWART HARTSHORN.

Witnesses:
S. D. LAW,
A. S. GURLITZ.